(No Model.)
T. P. FORD, Jr.
COMPOUND AND SELF ACTING PLUG VALVE FOR WASH BASINS.
No. 300,589. Patented June 17, 1884.
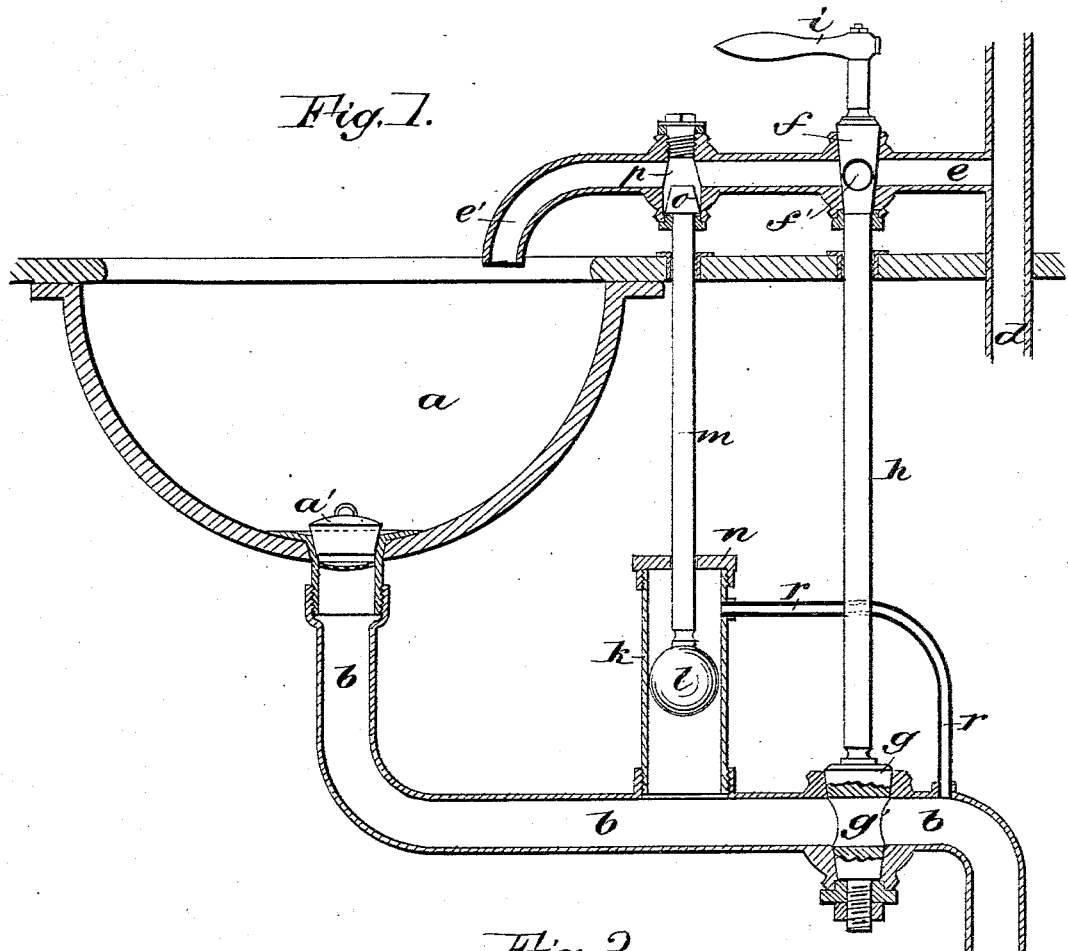
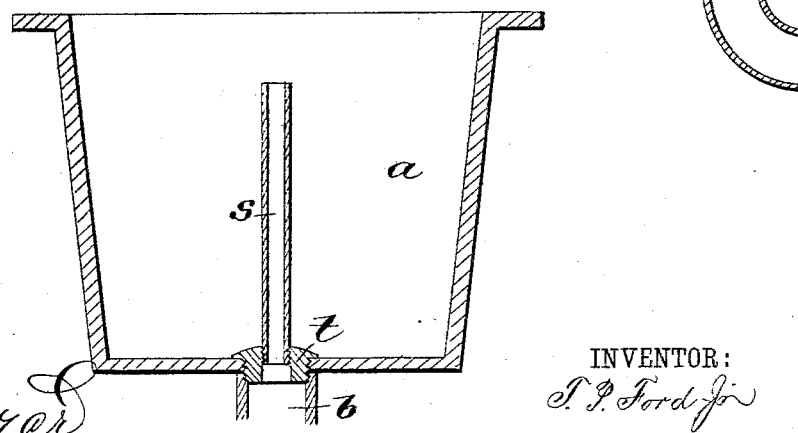
WITNESSES:
INVENTOR:
BY
ATTORNEYS.

UNITED STATES PATENT OFFICE.

THOMAS P. FORD, JR., OF BROOKLYN, NEW YORK.

COMPOUND AND SELF-ACTING PLUG-VALVE FOR WASH-BASINS.

SPECIFICATION forming part of Letters Patent No. 300,539, dated June 17, 1884.

Application filed December 18, 1883. (No model.)

*To all whom it may concern:*

Be it known that I, THOMAS P. FORD, Jr., of Brooklyn, in the county of Kings and State of New York, have invented certain new and useful Improvements in Compound and Self-Acting Plug-Valves for Wash-Basins, of which the following is a full, clear, and exact description.

The main object of my invention is to provide a system of valves for liquid pipe-connections to basins or other vessels, by which undue waste of water or other liquid may be prevented.

The invention consists in a couple of rigidly-connected valves fitted, respectively, in the supply and discharge pipes, and so that one valve shall close as the other opens, and vice versa, and a float-valve fitted in the inlet-pipe between its main valve and discharge-nozzle, to serve as a cut-off to prevent waste of the liquid when the main inlet-valve is carelessly left open.

The invention includes, also, particular constructions or arrangements of the outlet-valve of the discharge-pipe, also a connected float-valve casing and relief-pipe therefor, whereby said valve, casing, and relief-pipe are sealed by the trap against noxious gases, and in further details of construction, all as hereinafter fully described and claimed.

Reference is to be had to the accompanying drawings, forming part of this specification, in which similar letters of reference indicate corresponding parts in all the figures.

Figure 1 is a vertical sectional elevation of a wash-basin with supply and discharge pipes arranged in accordance with my invention; and Fig. 2 is a cross-section of a tank with means for maintaining a constant liquid-level therein, and as adapted for use with my improvements.

The letter $a$ indicates a wash-basin or other vessel having a discharge-pipe, $b$, and trapped at $c$ against escape of sewer-gases.

At $d$ is shown the water-service pipe, which has a branch inlet, $e$, to the basin $a$.

All the above-named parts may be of the usual or any approved construction.

The inlet-pipe $e$ has a plug-valve, $f$, to control in a general way the inflow of water to the basin, and the discharge-pipe $b$ has a plug-valve, $g$, to control the outflow from the basin. These valves $f$ $g$ are relatively located so as to connect rigidly with and to be turned simultaneously by a bar or stem, $h$, to be worked by any suitable handle, $i$.

The apertures $f'$ $g'$, respectively, of the valves $f$ $g$ are arranged at right angles with each other, so that valve $f$ will be open while valve $g$ will be closed, and vice versa.

Rising from, fixed to, and opening into the discharge-pipe $b$ is a chamber, $k$, fitted with any approved float-valve, $l$, having a stem, $m$, passing freely through the fixed and liquid-tight head $n$ of chamber $k$. Said stem $m$ carries at its upper end a plug-valve, $o$, which takes its seat at $p$ in a valve-casing fitted in pipe $e$ between the valve $f$ and the nozzle $e'$ of the supply-pipe. The valve $o$ has sufficient play in its casing to leave the passage of pipe $e$ unobstructed, as in the drawings, and to rise to cut off the water-flow.

At $r$ is shown a small pipe opening into the upper part of chamber $k$ and into the discharge-pipe $b$, and preferably between the valve $g$ and trap $c$, or in front of the trap, as shown.

The basin $a$ may have a stopper or plug, $a'$, and may be fitted with suitable overflow-conduits. (Not shown in the drawings.)

The operation is as follows: When the water-flow is cut off by closed valve $f$ and valve $g$ is open, the discharge or waste through pipe $b$ may freely take place, and the valve $o$ also is open. Should handle $i$ be operated to open valve $f$, which movement will simultaneously close valve $g$, the water will pass into the basin $a$, and may be retained therein for use by the stopper $a'$; but if the stopper is not applied, or a strainer only is fitted over the mouth of the discharge-pipe $b$, as in most kitchen basins or sinks, the water escaping from pipe $e$ will be held by the closed plug $g$, and will back up into chamber $k$ and lift float $l$, thereby closing valve $o$ self-actingly, and preventing further outflow from pipe $e$ of the water passing through the open valve $f$, and guarding in a simple and effective manner against undue waste of water, so often caused by carelessly leaving the inlet-valve open while attending to other duties. When valve $f$ is closed, the supply ceases, the discharge-valve $g$ opens, and the outflow therethrough causes cut-off valve $o$ to open, and the valves are ready for the next action. The pipe $r$ affords outlet from the top of chamber $k$ into the pipe $b$ or trap $c$ of air or of water which may have leaked past float $l$, and thus always facilitates the prompt rise of the float by the water-pressure from below, and insures a correspondingly prompt action of the valve $o$; and the pipe $r$, by connection with pipe $b$ in front of trap $c$, is sealed thereby against inflow of noxious gases; and a similar location of valve $g$ with reference to the trap seals the valve also, as will readily be understood.

The tank $a$ of Fig. 2 has a stand-pipe, $s$, rising from its bottom, and fitted, preferably, into a screw-plug, $t$, and so as to discharge into waste-pipe $b$, which arrangement may be employed when any liquid flowing from an inlet-pipe, $e$, and out from a discharge-pipe, $b$, fitted with valves, as above described, is to be maintained at about the level of the top of the pipe $s$ and without waste.

Having thus described my invention, I claim as new and desire to secure by Letters Patent—

1. A valve system for liquid pipe-connections to basins or other vessels, consisting of rigidly-connected valves $f$ $g$, working in the supply and discharge pipes $e$ $b$, respectively, and arranged to simultaneously close the inlet and open the discharge, or vice versa, and a self-acting float-valve, $o$, adapted to seat itself by liquid-pressure, and fitted in the pipe $e$ between the valve $f$ and the inlet discharge-nozzle, substantially as shown and described.

2. The combination, with the supply and discharge pipes $e b$, of the valves $f$ $g$, apertured at $f'$ $g'$ at right angles with each other, the float-chamber $k$, and the float-valve $l$ $m$ $o$, said float-chamber and float $k$ $l$ and the valve $g$ being located in front of the trap $c$, to be sealed thereby, substantially as shown and described.

3. The combination, with the pipe $b$, its float-chamber $k$, and float $l$, of the relief-pipe $r$, substantially as shown and described.

4. The combination, with the pipe $b$ and the float-chamber $k$ and float $l$, of the relief-pipe $r$, discharging into pipe $b$ in front of the trap $c$, to be sealed by the trap, substantially as shown and described.

THOMAS P. FORD, Jr.

Witnesses:
  HENRY L. GOODWIN,
  C. SEDGWICK.